(12) United States Patent
Bodie et al.

(10) Patent No.: US 6,799,754 B1
(45) Date of Patent: Oct. 5, 2004

(54) DUAL TRACK VARIABLE ORIFICE MOUNT

(75) Inventors: Mark O. Bodie, Dayton, OH (US);
Mark W. Long, Bellbrook, OH (US);
Sanjiv G. Tewani, Lebanon, OH (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 10/408,918

(22) Filed: Apr. 8, 2003

(51) Int. Cl.$^7$ .................................................. F16M 9/00
(52) U.S. Cl. .................................. 267/140.14; 267/219
(58) Field of Search ........................... 267/219, 140.14, 267/140.15, 140.13, 140.11, 140.12; 180/902, 311, 312, 300; 701/37, 38; 248/550, 562, 636, 638

(56) References Cited

U.S. PATENT DOCUMENTS

| | | | |
|---|---|---|---|
| 4,789,143 A | * 12/1988 | Smith et al. | ............ 267/140.14 |
| 4,969,632 A | * 11/1990 | Hodgson et al. | ....... 267/140.11 |
| 6,361,031 B1 | 3/2002 | Shores et al. | |
| 6,422,545 B1 | 7/2002 | Baudendistel et al. | |
| 6,439,556 B1 | 8/2002 | Baudendistel et al. | |
| 6,454,249 B1 | 9/2002 | Childers et al. | |
| 6,485,005 B1 | 11/2002 | Tewani et al. | |
| 6,547,226 B2 | 4/2003 | Shores et al. | |
| 6,622,995 B2 | 9/2003 | Baudendistel et al. | |
| 6,691,990 B2 | * 2/2004 | Bodie et al. | ............ 267/140.14 |
| 2003/0098535 A1 | * 5/2003 | Bodie et al. | ............ 267/140.13 |

* cited by examiner

*Primary Examiner*—Douglas C. Butler
(74) *Attorney, Agent, or Firm*—Michael D. Smith

(57) ABSTRACT

A powertrain mount comprises an orifice plate including two tracks, a control track and an isolation track. The control track is spirally formed within the orifice plate, which has an exit and entrance on either side of the plate. The control track provides damping to control damping from engine bounce; whereas, the isolation track controllably provides dynamic rate dip. The isolation track is formed between an alignment plate and rotatable track member, each having an exit and entrance, respectively. The rotatable track member and the alignment plate are sealingly engaged and affixed to a decoupler and an annular area disposed about the orifice plate of the powertrain mount. The exit of the alignment plate is adjacent the decoupler. The rotatable track member forms a cavity with the molded body of the powertrain mount, with the entrance exposed to fluid within the cavity for controlling and minimizing vibrations within the powertrain. The isolation track has a track length that may be varied by rotation of the track member and its entrance. Various magnitudes of disturbance frequencies may be managed and controlled by either the fixed control track and/or the variable isolation track within the powertrain mount.

12 Claims, 2 Drawing Sheets

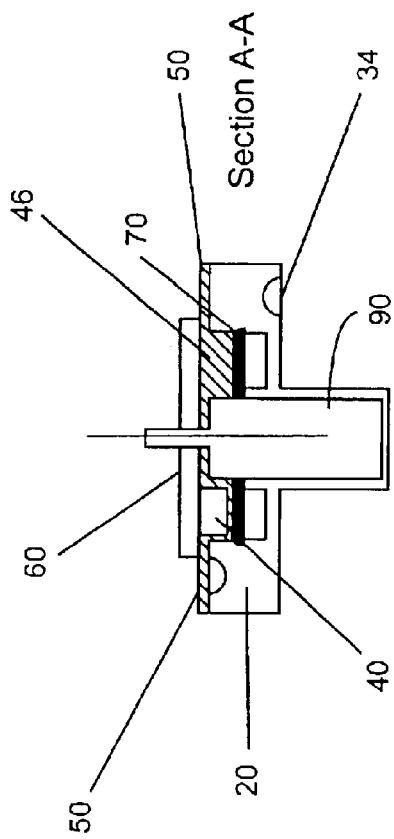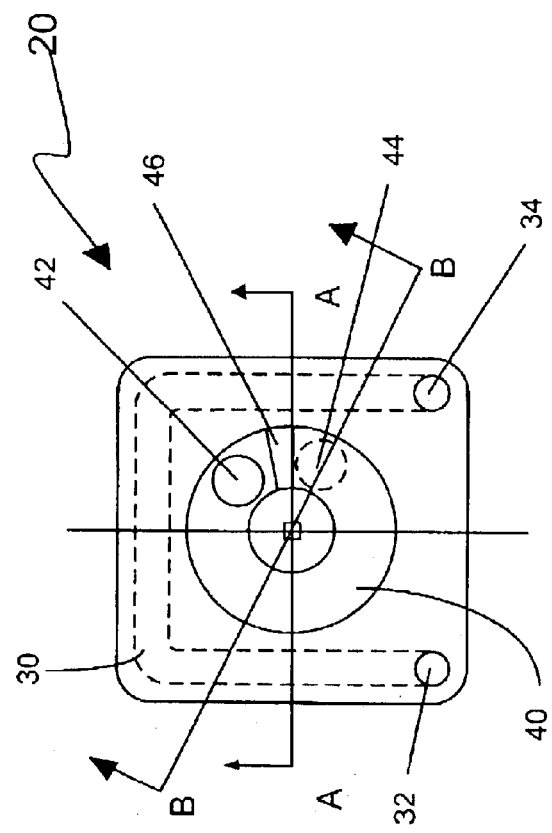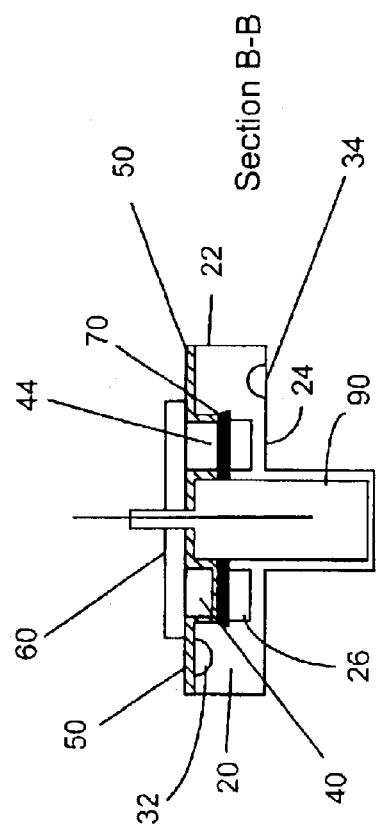

DUAL TRACK VARIABLE ORIFICE MOUNT

TECHNICAL FIELD OF THE INVENTION

The present invention relates to powertrain mounts for motor vehicles, and more particularly to a powertrain mount having a controllable compliant member.

BACKGROUND OF THE INVENTION

It is desirable to provide motor vehicles with improved operating smoothness by damping and/or isolating powertrain vibrations of the vehicle. A variety of mount assemblies are presently available to inhibit such engine and transmission vibrations. Hydraulic mount assemblies of this type typically include a reinforced, hollow rubber body that is closed by a resilient diaphragm so as to form a cavity. This cavity is separated into two chambers by a plate. A first or primary chamber is formed between the orifice plate and the body, and a secondary chamber is formed between the plate and the diaphragm.

The chambers may be in fluid communication through a relatively large central passage in the plate, and a decoupler may be positioned in the central passage of the plate disposed about the passage to reciprocate in response to the vibrations. The decoupler movement alone accommodates small volume changes in the two chambers. When, for example, the decoupler moves in a direction toward the diaphragm, the volume of the portion of the decoupler cavity in the primary chamber increases and the volume of the portion in the secondary chamber correspondingly decreases, and vice-versa. In this way, for certain small vibratory amplitudes and generally higher frequencies, fluid flow between the chambers is substantially avoided and undesirable hydraulic damping is eliminated. In effect, the decoupler is a passive tuning device.

As an alternative or in addition to the relatively large central passage, an orifice track is normally provided. The orifice track has a relatively small, restricted flow passage extending around the perimeter of the orifice plate. Each end of the track has an opening, with one opening communicating with the primary chamber and the other with the secondary chamber. The orifice track provides the hydraulic mount assembly with another passive tuning component, and when combined with the decoupler, provides at least three distinct dynamic operating modes. The particular operating mode is primarily determined by the flow of fluid between the two chambers.

More specifically, small amplitude vibrating input, such as from relatively smooth engine idling or the like, produces no damping due to the action of the decoupler, as explained above. In contrast, large amplitude vibrating inputs, such as large suspension inputs, produce high velocity fluid flow through the orifice track, and an accordingly high level of damping force and desirable control and smoothing action. A third or intermediate operational mode of the mount occurs during medium amplitude inputs experienced in normal driving and resulting in lower velocity fluid flow through the orifice track. In response to the decoupler switching from movement in one direction to another in each of the modes, a limited amount of fluid can bypass the orifice track by moving around the edges of the decoupler, smoothing the transition.

Prior decoupled powertrain mount designs therefore employ a decoupler that is dependent of vibration amplitudes/frequencies during compressions of the mount during fluid flow through the orifice plate. In some vehicle states, such as high-speed shake, it is advantageous to provide damping for small amplitude vibrations. During high-speed shake conditions, small imbalances in the vehicle's wheels excite the powertrain, which result in vibrations inside the cabin of the vehicle. By controlling the powertrain, providing damping, the vibrations inside the cabin of the vehicle are reduced.

For small mount displacements the dynamic stiffness of the mount is approximately the same as the static stiffness of the mount. Ideally, for isolation functions of a powertrain mount, the dynamic rate at the disturbance frequency should be as low as possible. Therefore, it is also desirable to lower the dynamic rate of the mount below a static rate of the mount at engine disturbance frequencies.

Prior powertrain designs also incorporate the use of a single orifice track to control both isolation and damping functions. Such designs require the powertrain mount to change between functions when some engine and environment conditions require both functions simultaneously. For example, a single-track orifice plate must change from bounce control (at around 10 Hz) to isolation (which starts at approximately 20 Hz).

It is desirable, therefore, to provide a powertrain mount that overcomes these and other disadvantages.

SUMMARY OF THE INVENTION

The present invention is a powertrain mount comprising an orifice plate including two tracks, a control track and an isolation track. The control track includes a fixed spirally formed track within the orifice plate, which has an exit and entrance on either side of the plate. The isolation track is formed between an alignment plate and rotatable track member, each having an exit and entrance respectively. The rotatable member and the alignment plate are sealingly engaged and affixed to a decoupler and an annular area disposed about the orifice plate of the powertrain mount. The exit of the alignment plate is adjacent the decoupler. The rotatable member with the orifice plate forms a cavity with a molded body of the powertrain mount, with the entrance of the rotatable member exposed to fluid within the cavity for controlling and minimizing vibrations within the powertrain. The isolation track has a track length that may be varied by rotation of the track member and its entrance. Various magnitudes of disturbance frequencies may be managed and controlled by either the fixed control track and/or the variable isolation track within the powertrain mount.

Accordingly one aspect of the invention includes rotation of the rotatable member and its entrance changes the length of the variable track. A motor operably connected and adapted to the rotatable member to rotate the rotatable member based on vibration frequencies. Rotation of the rotatable member changes the length of the variable track and allows fluid flow through the entrance of the rotatable member, along the isolation track, and to the decoupler via the exit of the alignment plate.

Another aspect of the present invention is to provide a powertrain mount of the type described above that improves isolation and damping of the mount at particular vibration disturbance frequencies. Still another aspect of the present invention is to provide a powertrain mount of the type described above in which specific ranges of amplitude frequencies of the powertrain are isolated or damped by selectively rotating the rotatable member to engage the decoupler member within the isolation track, while the control track passively controls other discreet vibrations.

The foregoing and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWING

FIG. 2 is a top perspective view of an orifice plate including a control track and an isolation track in accordance with the present invention;

FIG. 3 is a side perspective view cut at section B—B of an orifice plate including a control track and an isolation track in accordance with the present invention; and FIG. 3a is another side perspective view cut at section A—A of an orifice plate including a control track and an isolation track in accordance with the present invention.

DETAILED DESCRIPTION OF THE PRESENTLY PREFERRED EMBODIMENTS

Figure 1:
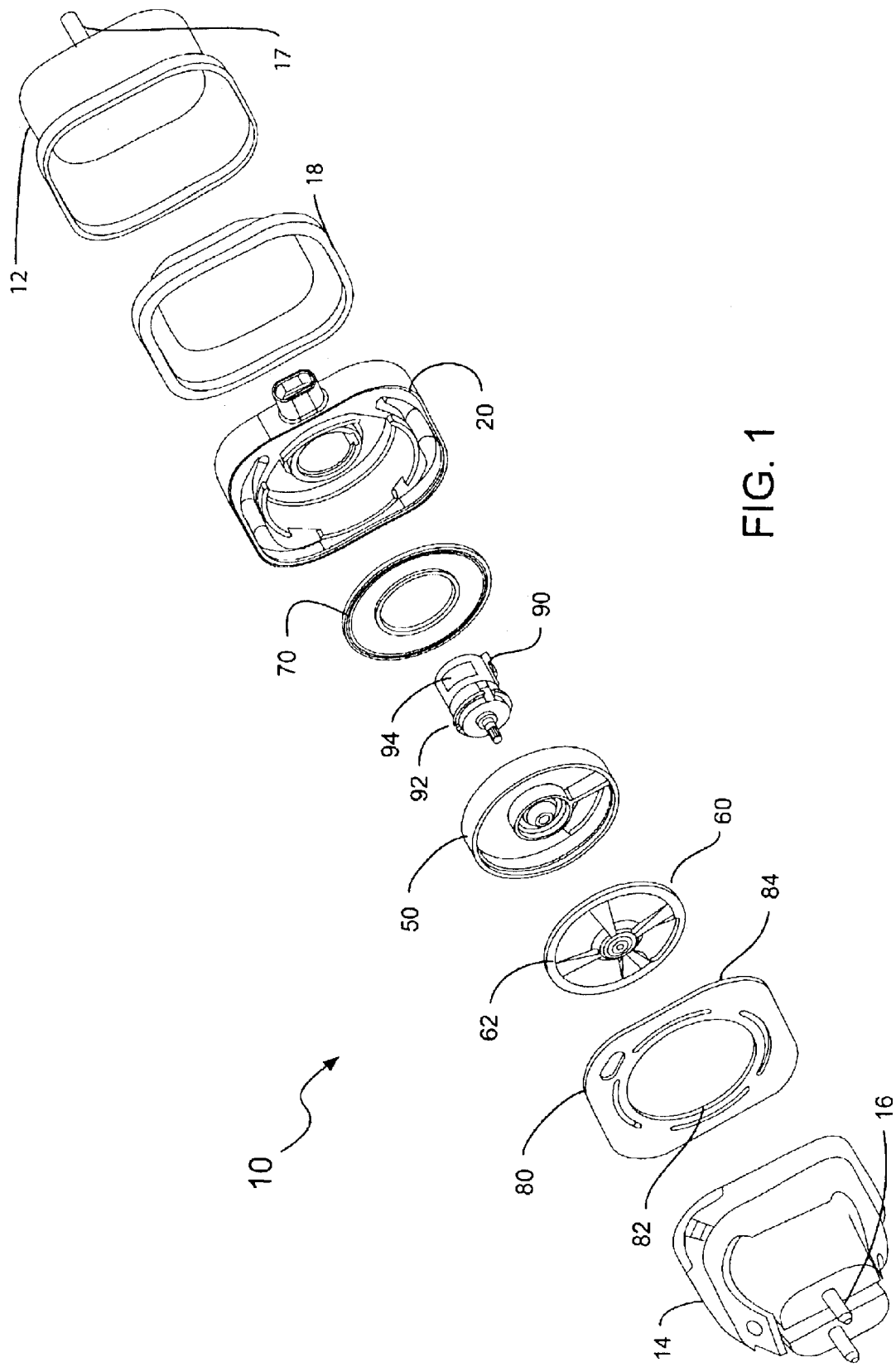
FIG. 1 is an exploded perspective view of a powertrain mount according to the present invention for a motor vehicle.

FIG. 1 shows an improved hydraulic mount assembly 10 according to the present invention. The mount assembly 10 is particularly adapted for mounting an internal combustion engine and/or transmission to a frame in a motor vehicle. The mount assembly 10 includes a metal base plate 12 and a molded body 14. The molded body 14 has an elastomeric portion molded around a metal substrate, and includes a plurality of studs 16 projecting outwardly to attach the molded body to the engine or transmission. The base plate 12 is similarly equipped with a plurality of outwardly projecting studs 17 to attach the base plate to the frame.

The base plate 12 and the molded body 14 are configured and joined to form a hollow cavity for receiving a damping liquid such as a glycol fluid. An elastomeric diaphragm 18 of natural or synthetic rubber is attached around its perimeter to the base plate 12 and/or to the body 14, and extends across the cavity. The diaphragm 18 may include an annular rim section having a radially inwardly facing internal groove formed between upper and lower shoulders such as is described in U.S. Pat. No. 5,263,693, the disclosure of which is hereby incorporated by reference. The shoulders are normally flexible so as to sealingly receive the periphery of a die-cast metal or plastic orifice plate 20.

The orifice plate 20 spans the cavity to define a primary chamber and a secondary chamber, as is well known. The orifice plate 20 includes a fixed spiraling track 30, best seen in FIG. 2, and an isolation track 40 that is generally within the same plane as the control track. Control track 30 has entrance 32 and exit 34 on either side of orifice plate 20. Track 30 may include varying degrees of traversing slope from entrance 32 to exit 34 (e.g. gradual or aggressive). Isolation track 40 has an entrance 42 and an exit 44. In one embodiment, wall extension 46 blocks fluid from directly flowing from variable track entrance 42 to the exit 44, promoting flow along the isolation track 40.

Referring now to FIG. 3, control track entrance 32 is shown on first side 22 of orifice plate 20, with the control track exit 34 on a second side 24 of fixed track 30. Isolation track 40 is formed by a rotatable member 60 sealingly engaged and adjacent to a alignment plate 50 which are both held against the orifice plate 20. Alignment plate 50 is disposed about annular surface 26 and the first side 22 of orifice plate 20, and adjacent to decoupler 70. Similarly, decoupler 70 is disposed about the annular surface 26 of the orifice plate 20. The alignment plate includes an exit 44, as seen in FIGS. 2 and 3, which exposes decoupler 70 to fluid within the powertrain mount 10. Alignment plate exit 44 therefore engages decoupler 70 by exposing fluid to the decoupler 70 at the end of isolation track 40. Rotatable member 60 includes entrance 42 for fluid flow from the chamber formed from the molded body 14 and the orifice plate 20 (best shown in FIGS. 1 and 2). In another embodiment of the invention, wall 46 extends from lower surface of rotatable member 60 into the variable track, preventing direct fluid flow from entrance 42 to exit 44. In yet another embodiment, wall 46 extends from the alignment plate 50 similarly blocking direct fluid flow from entrance 42 to exit 44, and forcing flow along the length of the variable track 40, best seen in FIG. 3a. Wall 46 extends from either the bottom side of the rotatable member 60 or the from the alignment plate 50 to force fluid flow through the entrance 42 of the rotatable member 60, along the variable isolation track, and through the exit 44 to the exposed decoupler 70, blocking fluid from directly flowing from the entrance 42 to the exit 44.

Referring back to FIG. 1, rotatable member 60 is held against orifice plate and in close proximity to alignment plate 50 by a containment plate 80. An inside diameter 82 of the containment plate 80 is sized to be closely received over legs 62 of the track member, while an outside diameter 84 of the containment plate 80 is affixed to the orifice plate 20. Thus, isolation track 40 may be generally structured by rotatable member entrance 42 with track formed by alignment plate 50 and rotatable member 60 and exit 44 exposing the decoupler 70.

In operation of one embodiment of the present invention, rotation of the rotatable member 60 changes the length of the isolation track 40. Rotation may be performed with a motor assembly 90, which includes motor 92 and encoder 94. The motor assembly 90 is operably connected to the rotatable member 60 and is sealed off from the two tracks 30 and 40. The motor assembly 90 is operably connected to a controller (not shown), and is sealed from operation of the isolation track. The encoder 94 or similar device measures an angular position of the rotatable member 60 and communicates with the controller. The controller determines vibration frequencies and rotates the motor to rotate the rotatable member 60 changing the length of the variable track 40 and allowing fluid flow through the entrance of the rotatable member 42, along the isolation track, and to the decoupler 70 via the exit 44 of the alignment plate 50. A dynamic rate dip occurs as a function of resonate frequency of the fluid in the track, which generally is a function of track length and area (i.e., freq ~Length/Area). The controller may receive one or more signals from a powertrain control module (not shown), such as r.p.m., to activate and rotate the motor and the track member entrance 42 to change the length of the isolation track 40, tracking engine disturbance frequencies and adjusts accordingly. Thus, the isolation track 40 operates to manage and control dynamic rate dip of engine operation, such as operational moments of force and other vibrations, to reduce the dynamic rate dip and reduce the stiffness of the mount 10 to further improve powertrain isolation.

Control track 30 performs as a passive track as it is fixed in length, continually operating to manage and control engine bounce or other various forms of road and environment input. Within the present invention, both the isolation track 40 and the control track 30 may be used simultaneously for wider range engine vibration disturbance frequencies. For example, in one embodiment of the invention, isolation track resonance starts at engine disturbance frequencies of 20 Hz or higher in the dual track orifice mount, allowing for higher ending resonance frequency. For large displacements across the mount, the decoupler 70 within the isolation track 40 is maximized (i.e., bottoms out), and forces fluid to flow into the control track 30, which provides damping to control the engine. Within the present invention, two orifice tracks are provided; the control track 30 to provide damping and a controllable isolation track 40 to provide a dynamic rate dip. As such, the present invention, includes, but is not limited to, the benefits of increasing the frequency range of the dynamic rate dip, and providing a dynamic rate dip in driving as well as idle conditions.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are embraced therein.

We claim:

1. A powertrain mount comprising:
    an orifice plate including a fixed spiral track and an annular track formed therein, the fixed spiral track disposed about the orifice plate including an entrance on a first side of the orifice plate and exit on a second side of the plate, and the annular track including an annular surface disposed about the orifice plate;
    a decoupler positioned adjacent the annular surface of the annular track;
    an alignment plate positioned adjacent the decoupler and the first side of the orifice plate, the alignment plate including an exit adjacent the decoupler; and
    a rotatable member including an entrance formed therein, the rotatable member rotatably coupled to the alignment plate defining a variable track between the rotatable member and the alignment plate, wherein a variable track length is determined by rotation of the rotatable member.

2. The powertrain mount of claim 1 further comprising a motor engaged with the rotatable member and adapted to rotate the rotatable member for changing the length of the variable track, the motor sealed from the variable track by the alignment plate.

3. The powertrain mount of claim 2 further comprising a containment plate attached to the orifice plate, the containment plate retaining the rotatable member against the orifice plate.

4. The powertrain mount of claim 3 further comprising:
    a motor assembly operably attached to the rotatable member, the motor assembly including the motor and an encoder; and
    a controller operably coupled to the encoder;
    wherein the encoder measures an angular position of the rotatable member and communicates with the controller, and the controller determines vibration frequencies and rotates the motor to rotate the rotatable member allowing fluid flow through the rotatable member entrance, the variable track, and the alignment plate opening.

5. The powertrain mount of claim 4 wherein the motor rotates the rotatable member entrance changing the length of the variable track and engages the decoupler via the alignment plate opening.

6. The powertrain mount of claim 4 wherein the alignment plate includes a wall adjacent the alignment plate exit, extending from an upper surface of the alignment plate into the variable track.

7. The powertrain mount of claim 4 wherein the rotatable member includes a wall adjacent the rotatable member entrance, extending from a lower side of the rotatable member into the variable track.

8. A powertrain mount comprising:
    an orifice plate including a fixed spiral track and an annular track formed therein, the fixed spiral track disposed about the orifice plate including an entrance on a first side of the orifice plate and exit on a second side of the plate, and the annular track including an annular surface disposed about the orifice plate;
    a decoupler positioned adjacent the annular surface of the annular track;
    an alignment plate positioned adjacent the decoupler and the first side of the orifice plate, the alignment plate including an exit adjacent the decoupler;
    means for forming a variable track; and
    means for changing a variable track length and controlling fluid flow through the variable track length based on pre-determined vibration frequencies within the powertrain mount.

9. A powertrain mount comprising:
    a base plate connected to a molded member defining a cavity;
    an orifice plate connected to one of the base plate or the molded member wherein the orifice plate spans the cavity defining a primary chamber and a secondary chamber, the orifice plate including a fixed track and an annular track formed therein, the fixed track spiralingly disposed about the orifice plate having an entrance on a first side of the orifice plate and exit on a second side of the orifice plate, and the annular track having an annular surface disposed about the orifice plate;
    a decoupler disposed about the annular surface of the annular track;
    an alignment plate sealingly formed about the decoupler and the first side of the orifice plate, the alignment plate including an exit adjacent the decoupler;
    a rotatable member rotatably coupled to the alignment plate and adjacent to the first side of the orifice plate, defining a variable track between the rotatable member and the alignment plate, the rotatable member including an entrance formed therein;
    a containment plate attached to the orifice plate retaining the rotatable member against the orifice plate; and
    a motor engaged with the rotatable member and adapted to rotate the rotatable member.

10. The powertrain mount of claim 9 further comprising:
    an encoder operably attached to the motor for measuring and communicating an angular position of the rotatable member; and
    a controller operably coupled to the encoder;
    wherein the controller determines vibration disturbance frequencies and communicates with the encoder to activate the motor to rotate the rotatable member to allow fluid flow into the rotatable member entrance, the variable track, and the orifice plate exit.

11. The powertrain mount of claim 10 wherein the alignment plate includes a wall adjacent the alignment plate exit extending into the variable track.

12. The powertrain mount of claim 10 wherein the rotatable member includes a wall adjacent the rotatable member entrance extending into the variable track.

* * * * *